UNITED STATES PATENT OFFICE.

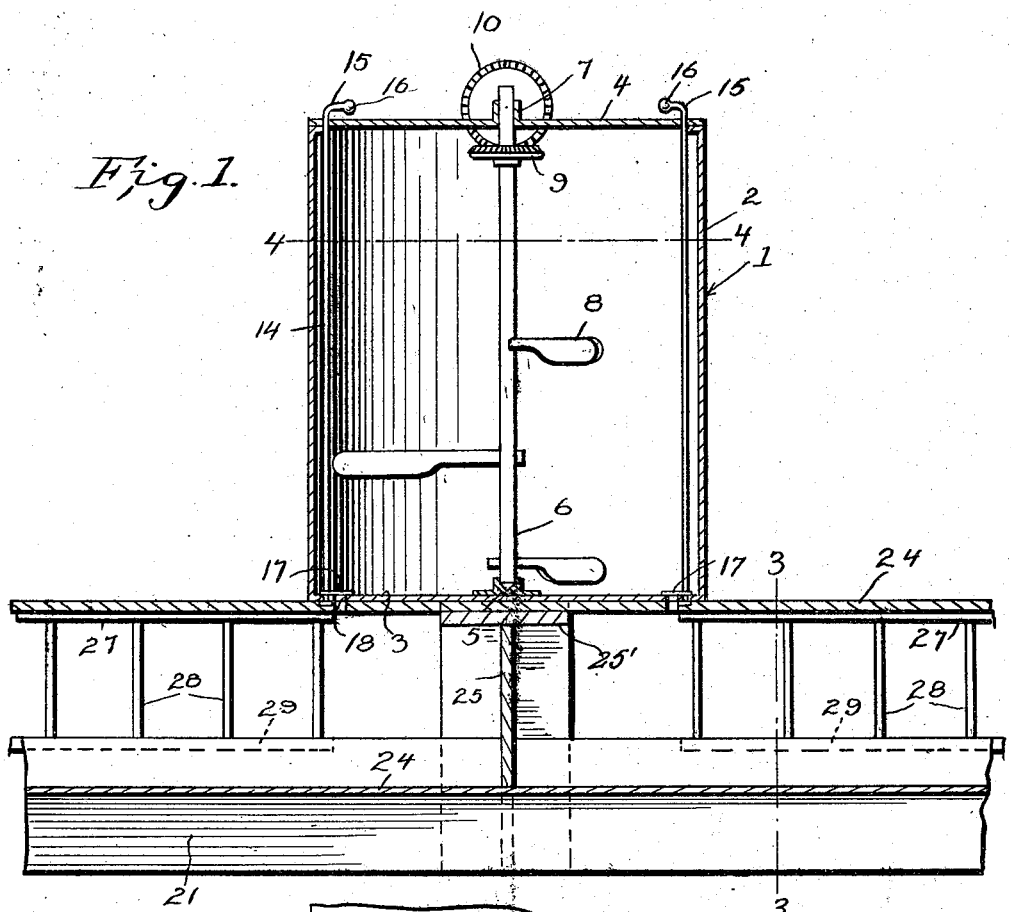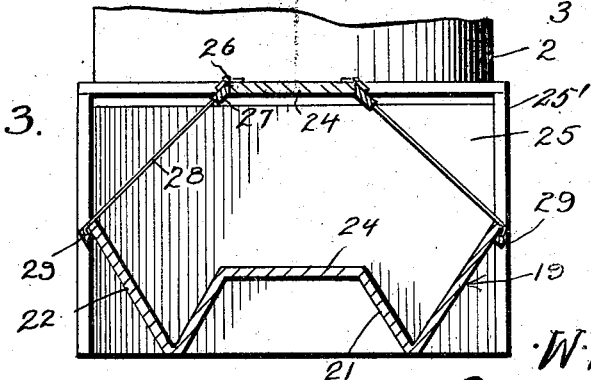

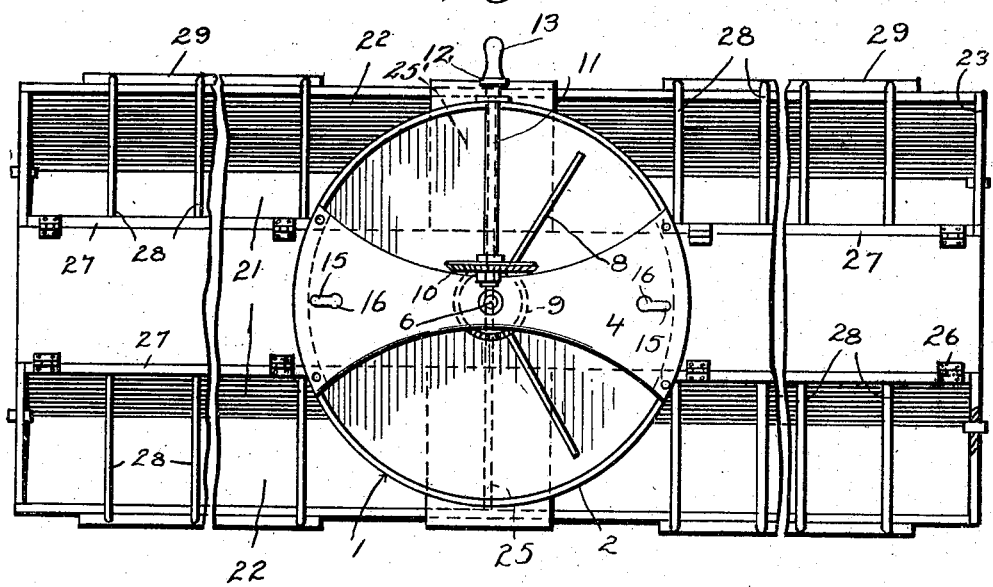
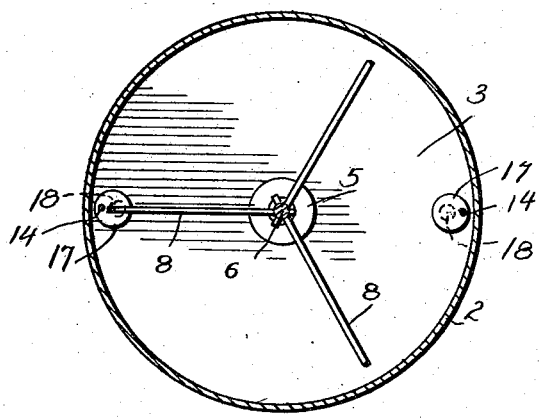
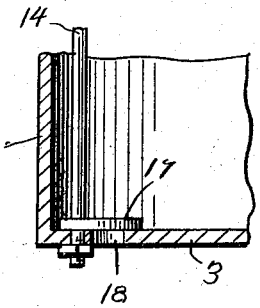

WILLIAM T. PATTERSON, OF SHELBINA, MISSOURI.

HOG-TROUGH.

1,223,199.  Specification of Letters Patent.  Patented Apr. 17, 1917.

Application filed October 29, 1914, Serial No. 869,267. Renewed September 28, 1916. Serial No. 122,746.

*To all whom it may concern:*

Be it known that I, WILLIAM T. PATTERSON, a citizen of the United States, residing at Shelbina, in the county of Shelby and State of Missouri, have invented certain new and useful Improvements in Hog-Troughs; and I do hereby declare the following to be a full, clear, and exact description of the invention, such as will enable others skilled in the art to which it appertains to make and use the same.

This invention relates to new and useful improvements in hog troughs, and has for its principal object to provide a trough which may be easily and quickly filled without necessitating the user handling the same.

With these and other objects in view, the invention consists in the novel combination and arrangement of parts which will be fully set forth in the following specification and accompanying drawings, in which, Figure 1 is a longitudinal sectional view of a hog trough constructed in accordance with this invention, Fig. 2 is a top plan view of Fig. 1, Fig. 3 is a transverse sectional view taken on line 3—3 of Fig. 1, Fig. 4 is a horizontal sectional view taken on line 4—4 of Fig. 1, and Fig. 5 is an enlarged detail sectional view of a fragment of the device illustrating the valve in detail.

Referring now to the drawings by characters of reference, the numeral 1 designates the tank or barrel for containing the swill, which comprises the cylindrical body 2 having at its lower terminal the closure 3. A suitable cover member 4 is arranged to be supported at the upper terminal of the body 2 and said cover member forms a closure therefor. Secured centrally of the bottom 3 is a suitable bearing member 5 in which the lower terminal of the shaft 6, which projects upwardly through the sleeve 7 formed in the cover member 4, is arranged to rotate. This shaft is provided at spaced intervals with suitable mixing paddles 8, and has secured in its upper terminal the beveled gear 9. This gear 9 is arranged to mesh with the beveled gear 10 which is rotatably mounted on the shaft 11, which projects through the side of the cylindrical body and is provided with a suitable crank 12 terminating in the handle 13 by means of which the device is rotated.

Extending vertically through the cylindrical body 1 at diametrically opposite points are the rods 14 which are provided at their upper terminals with the angular extension 15 carrying the gripping member 16. These rods are provided near their lower terminals with the disks 17 which are arranged to close the apertures 18 formed in the bottom of the cylindrical body 1 as clearly shown in Fig. 5.

The trough, which is designated generally by the numeral 19, comprises the central portion 20 having formed thereon the inclined side walls 21. These walls are extended and bent upwardly as at 22 and thereby form V-shaped troughs which extend longitudinally of the lateral edges of the member 20 as will be clearly seen upon referring to the drawings. Suitable end members 23 are secured to the free ends of the troughs and support the strip 24 in spaced relation with the strip 20 hereinbefore referred to and positioned across the central portion of the strip 24, a U-shaped supporting member 25' adapted to support the tank 2 over the trough and prevent the same from being accidentally displaced. A central partition wall 25 is secured in the trough intermediate its ends and said partition wall is arranged to separate the device into two separate troughs, as illustrated in Fig. 1.

Hingedly secured as at 26 to the lateral extremities of the strip 24 are the strips 27 carrying at spaced intervals the wires or rods 28, the lower terminals of which are secured to the bar 29, and it will thus be seen that a pair of hinged panels is provided for each of the troughs which will serve to prevent the hogs from climbing into the troughs and thereby polluting the contents.

It will be apparent from the foregoing that in use the container 1 is filled with the swill or other feed and the same may be thoroughly stirred by turning the crank 12 by means of the handle 13. The valves 17 are then opened, thus permitting the contents of the barrel to flow into the troughs. From the construction hereinbefore described, it will be apparent that the hogs may then devour the contents of the troughs through the openings between the bars 28, and it will also be apparent that the animals will be prevented from getting their feet into the troughs and polluting the contents thereof.

What is claimed is:

1. A hog feeding device including the combination with a container comprising a cylindrical body, a closure at the lower terminal of the cylindrical body, said closure being provided with a pair of outlet ports, troughs supported beneath the container, and means for supporting the container directly over the troughs, said troughs being provided with a pair of hinged panels, the panels being arranged to form division members and prevent the animals from placing anything but their heads in the troughs, and a strip disposed between the troughs and rigidly connected to the same for holding the troughs at a relatively spaced distance apart for preventing the animals from coming into contact with one another when feeding.

2. A hog feeding device including a container, said container comprising a cylindrical body, a closure at the lower terminal of the cylindrical body, said closure being provided with outlet ports, valves controlling the flow of the contents of the container through the outlet ports, of troughs, means positioned centrally over the troughs for supporting the container over the same, said troughs being provided with a central partition wall, and comprising a central ridge member, downward extensions formed laterally of the ridge member, said downward extensions being provided on their free edges with upturned portions, the upturned portions and downward extensions forming V-shaped troughs laterally of the ridge member, and hinged panels operatively mounted with relation to the troughs, said hinged panels being arranged to be swung upwardly to enable the person using the device to clean the same, and a connecting strip disposed between the two troughs and connected thereto for holding the same at relatively spaced distance apart preventing the faces of the animals from coming into contact with one another when feeding.

In testimony whereof I affix my signature in presence of two witnesses.

WILLIAM T. PATTERSON.

Witnesses:
NORA McHENRY,
J. B. WHITE.

Copies of this patent may be obtained for five cents each, by addressing the " Commissioner of Patents. Washington, D. C."